April 11, 1967     L. H. MORIN     3,313,426
METHOD AND APPARATUS FOR STOPPING DIE CASTING OR MOLDING
MACHINES IN EVENT OF MALFUNCTIONING OF AN INSERT
ENGAGING AND POSITIONING MECHANISM
Filed June 9, 1964
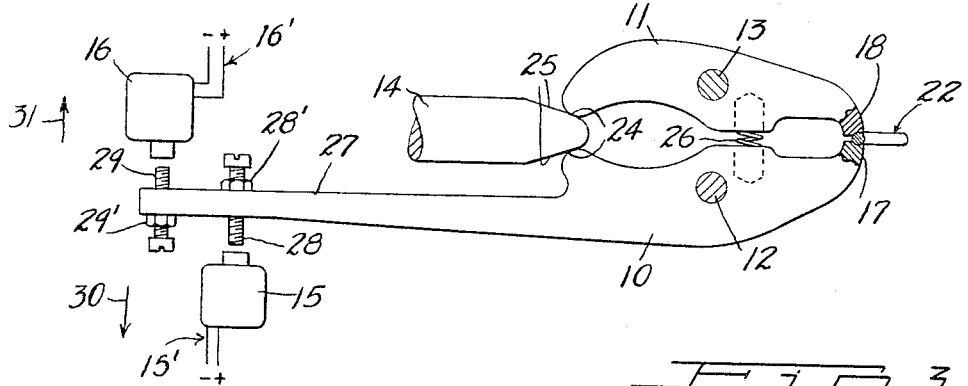
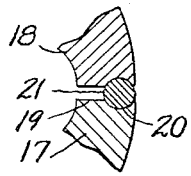
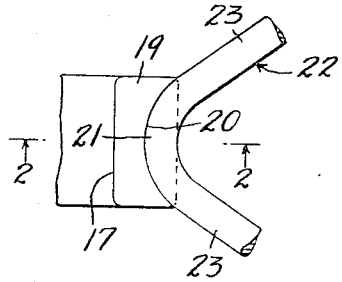
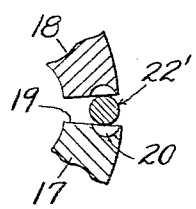
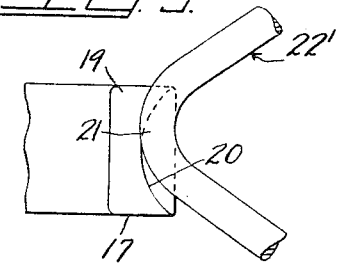
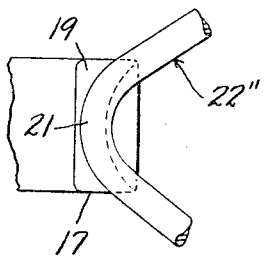
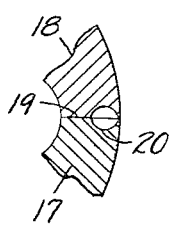
INVENTOR.
LOUIS H. MORIN
BY
Howard E. Thompson
ATTORNEY United States Patent Office 3,313,426
Patented Apr. 11, 1967

3,313,426
METHOD AND APPARATUS FOR STOPPING DIE CASTING OR MOLDING MACHINES IN EVENT OF MALFUNCTIONING OF AN INSERT ENGAGING AND POSITIONING MECHANISM
Louis H. Morin, Bronx, N.Y., assignor to Coats & Clark Inc., New York, N.Y., a corporation of Delaware
Filed June 9, 1964, Ser. No. 373,818
6 Claims. (Cl. 214—1)

This invention relates to die casting and molding machines, wherein means is provided for engaging and then supporting or positioning an insert in proper position between cavities of dies employed in machines of the kind under consideration in forming cast or molded products, including an insert therein. More particularly, the invention deals in a method of automatically stopping operation of the machine as and when an insert is not properly positioned between the pickup means employed such, for example, as a pair of grippers and/or in the event that an insert fails to be positioned between such grippers for delivery to position between the dies of the machine.

Still more particularly, the invention deals with a mechanism of the character defined, wherein one of the members or jaws of the mechanism supports a pair of adjustable switch operating screws controlling the circuit to the machine in conjunction with which the mechanism is employed.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic plan view of a mechanism made according to my invention, illustrating the parts in correct operative position in pickup of an insert for positioning between a pair of dies, part of the construction being broken away and in section.

FIG. 2 is an enlarged sectional detail view of the jaw ends of the grippers shown in FIG. 1 in engagement with an insert, the central portion of the insert only being shown in section, the section being on the line 2—2 of FIG. 3.

FIG. 3 is a plan view of the jaw end of one of the grippers showing the insert properly located therein, in other words, a plan view of the lower jaw as noted in FIGS. 1 and 2.

FIGS. 4 and 5 are views, similar to FIGS. 2 and 3, illustrating the position of the jaws, with the insert in the off alined location shown in FIG. 5.

FIGS. 6 and 7 again are views generally similar to FIGS. 2 and 3 illustrating the position of the jaws with the insert in the position clearly illustrated in FIG. 7; and FIG. 8 is a view, similar to FIGS. 2, 4 and 6, showing the jaw ends in abutting engagement, the position assumed thereby when no insert has been engaged by the jaws.

In illustrating one adaptation and use of my invention, I have shown an insert engaging and positioning mechanism, generally of the type and kind disclosed in my application Ser. No. 351,107, filed Mar. 11, 1964. Said application deals with the pickup and delivery of a V-shaped rod insert to the dies of an injection molding machine in formation of plastic bodies upon ends of the insert diverging from the rounded central portion thereof. By reference to this application, detailed showing herein with regard to dies and other actuating mechanisms can be dispensed with, as the mechanism herein is illustrated diagrammatically and its operation will be readily understandable to anyone skilled in the art.

Considering FIG. 1 of the drawing, 10 and 11 are a pair of grippers pivoted about posts 12 and 13, respectively, the posts constituting part of means for moving the grippers from an insert pickup station to a delivery station in alinement with a pair of dies. Movable with this means is a piston rod 14 and two switches 15 and 16, such as microswitches. This will be apparent from the illustration of the means disclosed in the application above-identified.

The grippers 10 and 11 have jaw ends 17 and 18, the structure of each of which is the same and, as the jaw end 17 only has been shown in FIGS. 3, 5 and 7, the brief description of this jaw end will apply to both. The jaw end 17 has a flat surface 19, in which is formed a semi-circular cutout 20, which can be termed an insert alinement socket, which conforms to and sungly receives the rounded central portion 21 of a substantially V-shaped insert 22, the insert having diverging ends 23, upon which a molded body or bodies or a cast body or bodies can be formed.

Opposed to the jaw ends 17 and 18, the grippers have inturned and alined rounded portions 24 adapted to be engaged by contracted surfaces 25 on a V-shaped end of the piston rod 14. A spring 26 is mounted between the grippers inwardly of the ends 17 and 18 to tensionally urge the rounded portions 24 toward each other or into engagement with the surfaces 25 of the rod 14. This rod is air or otherwise operated to timely move the jaw ends into gripping position in picking up an insert 22 and retaining the same in position, until such time as the insert is properly positioned between the dies at the molding or casting station; whereupon, the rod 14 is retracted and the spring 26 separates the jaw ends to free the insert.

The gripper 10 differs from the gripper 11 in having a long arm 27, end portions of which adjustably support switch actuating screws 28 and 29 for operating the micro or other switches 15 and 16, respectively. Each of the screws have lock nuts 28', 29' to retain the same in any carefully adjusted position. Extending to the switches are plus and minus circuit wires, the wires to the switch 15 being illustrated, in part, at 15' and the wires to the switch 16 being illustrated at 16'. These wires extend to the casting or molding station and operate suitable mechanisms to automatically stop the machine as and when contact is established between 28 and 15 or 29 and 16 in malfunctioning of the insert engaging and positioning mechanism, of which the grippers 10 and 11 constitute a part.

As previously stated, the showing in FIG. 1 illustrates the position of the long arm 27 when the insert 22 is properly engaged by the jaw ends 17 and 18 of the grippers. This proper engagement is more clearly illustrated in FIGS. 2 and 3 of the drawing. Particularly noting FIG. 3, it will appear that the rounded portion 21 of the insert 22 is seated properly in the socket 20. When in this position, the screws 28 and 29 are maintained in spaced relationship with respect to the switches 15 and 16, as illustrated in FIG. 1 of the drawing.

At this time, it is pointed out that, by providing the long arm 27, a slight variation in proper positioning of the jaw ends 17 and 18 can result in actuation of either of the switches 15 and 16 when the screws 28 and 29 are in their properly adjusted positions. There are actually two definite controls, one of which is the complete closing of the jaw ends 17 and 18, as noted in FIG. 8 of the drawing by virtue of the fact that an insert was not available at the pickup station. This would provide a greater movement of the long end 27 of the gripper 10 in the direction of the arrow 30, FIG. 1, which would bring the screw 28 into operative engagement with the switch 15, causing the machine to be automatically stopped.

The second control would be in the failure of the jaw ends 17 and 18 to come into their proper gripping position, as shown in FIGS. 1, 2 and 3. There are several ways that this might be accomplished but depending upon the structural characteristics of the insert employed. However, in the present illustration, one of these malfunctionings is diagrammatically illustrated in FIGS. 4 and 5 of the drawing, wherein the insert, as illustrated at 22' in FIG. 5, is off-centered with respect to the socket 20, so that the insert would be engaged by part of the flat surface 19, thus creating a wider spread of the jaw ends 17 and 18, as clearly illustrated in FIG. 4, which would result in transmitting movement of the long end 27 of the gripper 10 in the direction of the arrow 31 of FIG. 1, bringing the screw 29 into engagement with and actuating the switch 16 to, in like manner, automatically stop the machine.

In FIGS. 6 and 7, I have diagrammatically illustrated another malfunctioning of the grippers wherein, the insert, as at 22", has been positioned between the flat surfaces of the jaws or, in other words, with the rounded portion 21 arranged upon the surface 19 of the jaw end 17. Here, the action would be generally similar to that of the malfunctioning noted in FIGS. 4 and 5 of the drawing and, again, the long arm 27 would move in the direction of the arrow 31 and result in actuation of the switch 16.

As with other machines of the type and kind under consideration, as and when the casting or molding machine has been automatically stopped through actuation of either of the switches 15 and 16, controls of such machines are also automatically cut out so that, as and when the proper adjustment has been made in re-filling the pickup station to avoid the condition illustrated in FIG. 8 or the improperly positioned insert removed or properly positioned between the jaw ends of the gripper, it is then essential to put the machine into operation as in initially starting the machine in a predetermined run or successive series of automatic operations.

In operation of the mechanism disclosed, it will be apparent that the grippers have a functioning period from the time of engagement of an insert or the failure to engage an insert, as in FIG. 8. This period includes transfer of the insert from the pickup station to positioning of the insert between the dies at the casting or molding station and this period terminates as and when the dies close upon the insert and the grippers are moved out of engagement with the insert now supported in the dies. Thus, there is a second or non-functioning period, namely in the return of the grippers to the pickup station, preparatory to then again performing the first period.

For control of these two periods, suitable automatic means is employed on the machine timed with functioning and operation of the grippers, including the piston rod 14 to energize the two microswitches 15 and 16 during the first period and automatically cutting off the current supply to the microswitches during the second period mentioned above. It will, thus, be apparent that, when the grippers are moved from the casting or molding station to the pickup station, the spring 26 supports the jaw ends 17 and 18 in sufficiently spaced relationship to freely grasp the next successive insert at the pickup station but, in this positioning of the grippers, the microswitch 16 will not function to stop the machine. The degree of separation of the jaw ends 17 and 18 can be checked by engagement of rounded ends 24 with the surfaces 25 of the piston rod 14.

Machines of the type and kind under consideration operate at high speeds. Thus, it is important that, during the functioning period of the grippers, namely the period between the pickup station and the dies, the machine be stopped at any time during this functioning period and up to the time in which the dies have engaged the insert; whereupon, the grippers quickly return to the pickup station during the non-functioning period, preparatory to the next cycle of operation of the grippers. In this high speed operation, it is understood that the casting or molding operation is being performed on the delivered insert supported in the dies during at least part of the functioning period of the grippers and it is here important to keep in mind that, if no insert appears at the pickup station, the machine would be instantly stopped by the controls provided and, at this moment, the product formed on the previously delivered insert to the dies might be still positioned between or adjacent the dies and not delivered to a trimming and stripper station as illustrated, for example, in the application heretofore mentioned.

Having fully described my invention, what I claim as new and desire to secure by Letters Patent is:

1. An insert engaging and positioning mechanism comprising a pair of pivoted grippers having jaw ends and inwardly contracted rounded opposed ends, a piston rod operatively engaging said rounded ends in movement of the jaw ends toward each other, means normally urging the jaw ends in spaced relationship to each other, adjacent surfaces of the jaw ends being contoured to form sockets for engagement with an insert, one of said grippers having an extending long arm, two oppositely directed adjustable means supported in connection with the free end portion of said arm, a switch positioned adjacent each of said adjustable means, both of said switches operatively controlling a machine to stop the machine through actuation of either of the switches by the adjacent adjustable means, and said adjustable means being adjusted to prevent switch operation in proper engagement of the jaw ends of said grippers with an insert in the operation of said mechanism.

2. A mechanism as defined in claim 1, wherein improper positioning of an insert between the jaw ends of said grippers will result in actuation of one of the switches by one of said adjustable means.

3. A mechanism as defined in claim 2, wherein failure of the jaw ends to engage an insert will result in actuation of the other of said switches by the other of said adjustable means.

4. A mechanism as defined in claim 1, wherein the sockets of said jaw ends are arranged on adjacent flat surfaces of said jaw ends, and said sockets being semicircular in contour.

5. An insert, engaging and positioning mechanism comprising a pair of pivoted grippers having jaw ends and opposed ends, a piston rod operatively engaging said opposed ends in movement of the jaw ends toward each other, means normally urging the jaw ends in spaced relationship to each other, adjacent surfaces of the jaw ends being contoured to form sockets for engagement with an insert, one of said grippers having an arm, switch operating means supported in connection with the free end portion of said arm, switch means positioned adjacent said switch operating means, said switch means operatively controlling a machine to stop the machine through actuation of said switch means by the switch operating means, and said switch operating means being adjusted to prevent switch operation in proper engagement of the jaw end of said grippers with an insert in the operation of said mechanism.

6. In an electrically operated machine employing insert engaging and positioning mechanism, the method of automatically stopping the machine in the event of malfunctioning of such mechanism, which comprises closing a pair of pivoted gripper jaws on an insert to be transferred from one position to another, continuing normal functioning of said machine and mechanism when said jaws close on an insert in its normal position between said jaws, moving said jaws to an abnormal position either opened or closed too much in relation to the normal position thereof when there is no insert or one is improperly positioned in said jaws, using one end of one of said grippers opposite to the jaw end thereof to operate a cut-off switch whenever the grippers are supposed to grip an insert but there is no insert or one is improperly located in the gripper jaws and thus the jaws are opened or closed more than the normal position thereof for a properly placed insert, using a tapered piston rod between said grippers on the rear side thereof opposite to said gripper jaws to close said jaws and using a spring to open said jaws.

References Cited by the Examiner

UNITED STATES PATENTS

| | | | |
|---|---|---|---|
| 230,638 | 8/1880 | King | 214—1 |
| 3,069,749 | 12/1962 | Gartner | 72—422 |
| 3,244,296 | 4/1966 | Chamberlain | 198—232 X |

MARVIN A. CHAMPION, *Primary Examiner.*